US008579268B2

(12) United States Patent
Duc et al.

(10) Patent No.: US 8,579,268 B2

(45) Date of Patent: Nov. 12, 2013

(54) DAMPING DEVICE FOR A HATCH IN A MILITARY VEHICLE

(75) Inventors: Christian Duc, Chandon (FR); André Monchalin, Mably (FR)

(73) Assignee: Nexter Systems, Roanne (FR)

( * ) Notice: Subject to any disclaimer, the term of this patent is extended or adjusted under 35 U.S.C. 154(b) by 338 days.

(21) Appl. No.: 12/588,658

(22) Filed: Oct. 22, 2009

(65) Prior Publication Data

US 2010/0102494 A1 Apr. 29, 2010

(30) Foreign Application Priority Data

Oct. 29, 2008 (FR) ..................................... 08 06007

(51) Int. Cl.
*F16F 5/00* (2006.01)
*F16F 9/50* (2006.01)

(52) U.S. Cl.
USPC .......... 267/140.12; 188/266; 188/284; 16/50; 16/221

(58) Field of Classification Search
USPC ........ 267/140.11, 140.12; 188/130, 266, 281, 188/284; 16/50, 221, 255, 277
See application file for complete search history.

(56) References Cited

U.S. PATENT DOCUMENTS

| | | | | |
|---|---|---|---|---|
| 1,824,217 | A * | 9/1931 | Friedrich | 16/54 |
| 3,000,043 | A * | 9/1961 | Check | 16/64 |
| 3,056,004 | A * | 9/1962 | Davis | 200/83 Y |
| 4,829,628 | A * | 5/1989 | Vuksic | 16/54 |
| 6,394,435 | B1 | 5/2002 | Monson | |
| 6,611,977 | B1 * | 9/2003 | Schuman et al. | 5/200.1 |
| 2003/0051312 | A1 * | 3/2003 | Hoffmann et al. | 16/50 |
| 2005/0246863 | A1 | 11/2005 | Chesworth et al. | |

FOREIGN PATENT DOCUMENTS

| | | | |
|---|---|---|---|
| CH | 434 024 | | 4/1967 |
| EP | 1 645 834 | A1 | 4/2006 |
| FR | 2751020 | A1 * | 1/1998 |
| FR | 2 860 037 | A1 | 3/2005 |

OTHER PUBLICATIONS

English Machine translation of EP-1645834, Apr. 12, 2006.*
FR-2751020 English Machine Translation.*
French Search Report issued in French Patent Application No. 0 806 007 on May 19, 2009 (with translation).

* cited by examiner

*Primary Examiner* — Melody Burch
(74) *Attorney, Agent, or Firm* — Oliff & Berridge, PLC

(57) ABSTRACT

A damping device for a hatch in a military vehicle used during its closing and opening, said hatch being integral with hinges hinged with respect to an interface, wherein said device comprises a tubular body integral with the hinges and hinged between two bearings integral with the interface, said body enclosing two fixed damping means between which a rod is positioned, said rod being mobile in translation to activate one of the damping means during the opening of the hatch and the other damping means during the closing of the hatch.

9 Claims, 3 Drawing Sheets

Closed Position

Open Position

DAMPING DEVICE FOR A HATCH IN A MILITARY VEHICLE

BACKGROUND OF THE INVENTION

1. Field of the Invention

The technical scope of the present invention is that of openings for military vehicles, such as access hatches to enter to vehicle or hatches providing an external view.

2. Description of the Related Art

A hatch of this type is generally a panel of substantial mass which requires opening assistance means and shock-absorbing means for the opening and closing phases because of the mass in motion.

Shock-absorbing means are known that comprise torsion blades. This technology is satisfactory but is complicated to define and implement.

Belleville washers have been proposed for use in door opening and closing systems.

Thus, patent FR-2860037 describes a system in which these washers are used to restore a closing torque on a door. To damp the movement of the door, this patent describes complex hydraulic means incorporating a fluid compression chamber and an expansion chamber.

U.S. Pat. No. 6,394,435 proposes the use of Belleville washers in combination with an elastomer. The role of the washers is to support the static mass so as to isolate the elastomer from the static forces. In the application described, Belleville washers are linked to a heavy mass and the displacements of this mass cause these washers to be compressed.

None of these documents describes the damping of the stroke of a hatch during the opening and closing of said hatch.

SUMMARY OF THE INVENTION

The aim of the present invention is to supply a damping device for a hatch that enables this damping to be adapted according to the hatch, either during closing or opening.

The invention thus relates to a damping device for a hatch in a military vehicle used during its closing and opening, said hatch being integral with hinges hinged with respect to an interface, wherein it comprises a tubular body integral with the hinges and hinged between two bearings integral with the interface, said body enclosing two fixed damping means between which a rod is positioned, said rod being mobile in translation to activate one of the damping means during the opening of the hatch and the other damping means during the closing of the hatch.

According to one characteristic of the invention, the rod is integral in rotation with the tubular body.

According to another characteristic of the invention, the rod is linked to the tubular body by means of a long nipple screw.

According to yet another characteristic of the invention, the rod is equipped with a helicoidal groove in which a finger integral with the interface is engaged so as to impart to it a translational movement.

According to yet another characteristic of the invention, the damping means are in the form of a cartridge enclosing Belleville washers and inserted into the tubular body.

According to yet another characteristic of the invention, each cartridge comprises a compression piston for the washers equipped with a finger pressing on the rod.

According to yet another characteristic of the invention, the washers are mounted in opposition or in parallel in the cartridge According to yet another characteristic of the invention, each cartridge presses on an internal shoulder in the tubular body and is held at its base by a spring retaining ring.

According to yet another characteristic of the invention, each cartridge is closed by means of a threaded plug.

According to yet another characteristic of the invention, the damping means are of different stiffnesses.

A first advantage of the present invention lies in the fact that damping is obtained through the deformation of the Belleville washers inside a cartridge.

Another advantage lies in the fact that the cartridges can be pre-mounted and pre-adjusted depending on the hatch whose displacement is required to be damped.

Another advantage lies in the fact that it is possible to have a different stiffness for the damping of the opening movement and for that of the closing movement.

Yet another advantage of the invention lies in the fact that the cartridges may be easily changed.

BRIEF DESCRIPTION OF THE DRAWINGS

Other characteristics, advantages and particulars of the invention will become more apparent from the following additional description of the embodiments given by way of example in reference to the drawings, in which.

DETAILED DESCRIPTION OF PREFERRED EMBODIMENTS

A hatch is generally a heavy plate that is difficult to maneuver by the vehicle crew and generally means are provided to assist its opening and closing. These are generally hatches intended for the cockpit and commander's post. Given the mass of such hatches, they need to be damped at the end of their stroke at the moment of closing and the end of the opening operation.

Figure 1:
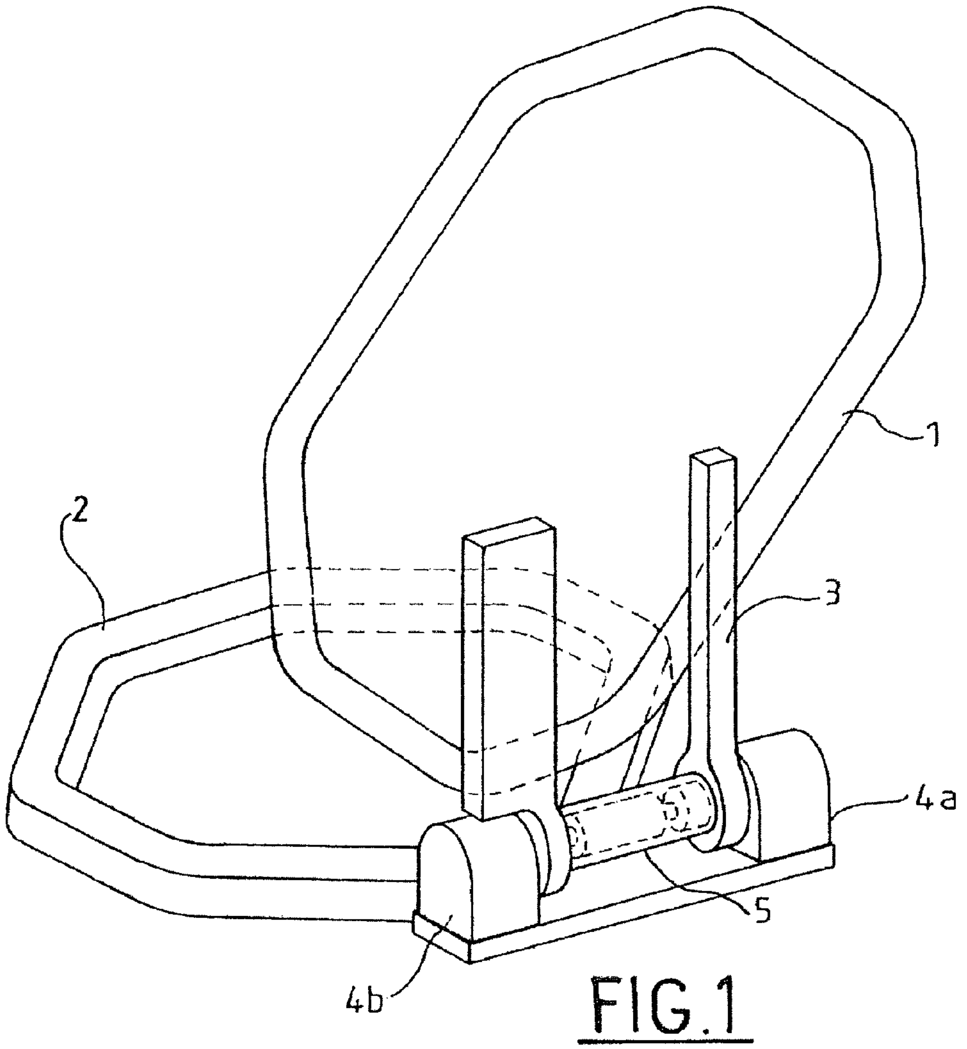
FIG. 1 shows a general view of a hatch.

FIG. 1 shows a schematic view of a hatch 1 in the form of a plate integral with an interface 2 by means of hinges 3 hinged with respect to the interface. The hinge link is constituted by a tubular body 5 whose ends are supported by bearings 4*a* and 4*b* integral with the interface 2. The interface 2 is classically positioned in an opening of the vehicle structure, for example the roof, by means known to the expert. Thus, by rotating the body 5, the hatch 1 is brought into the closed position pressing on the interface in the open position shown in this Figure.

Figure 2:
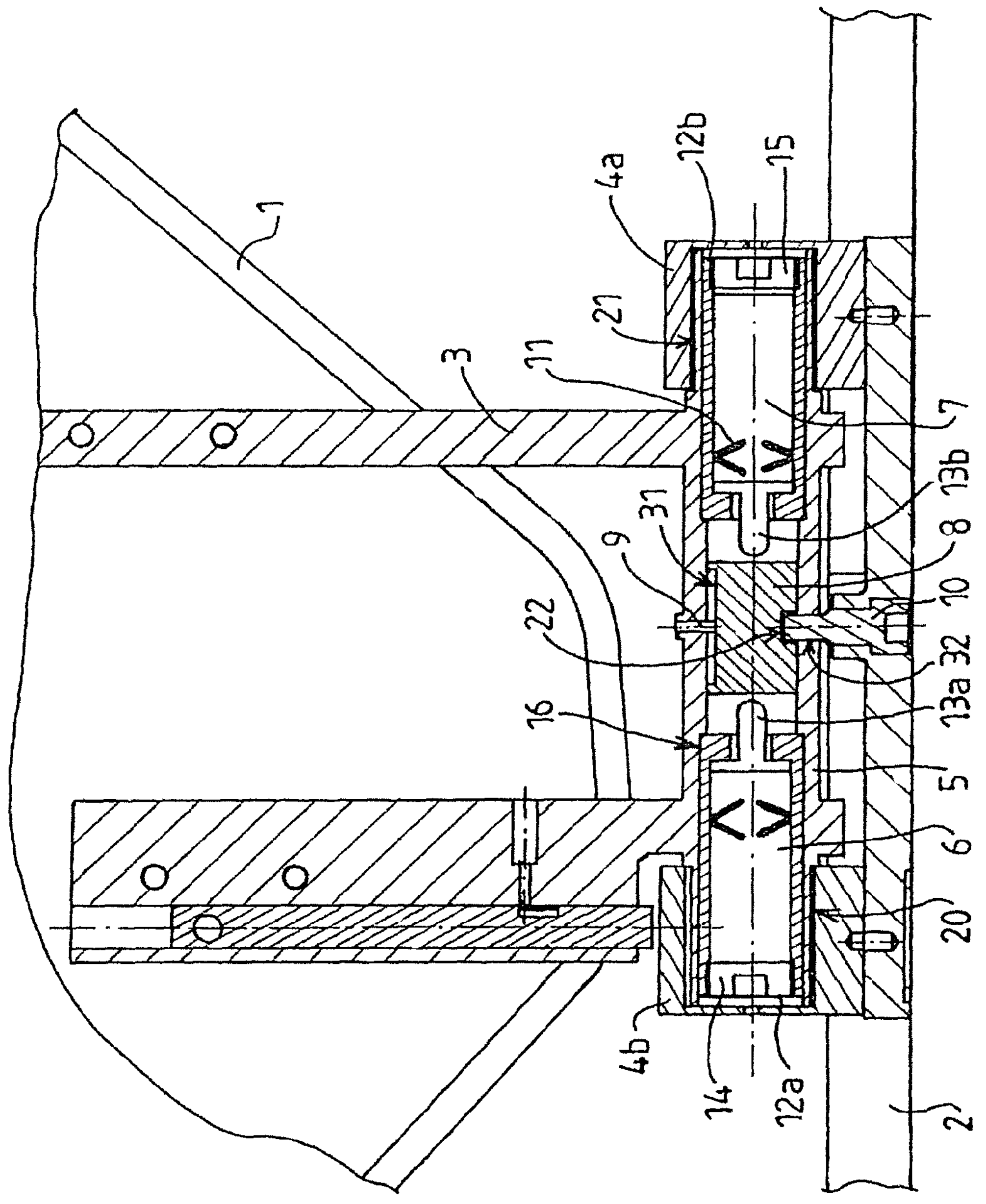
FIG. 2 is a section view showing the hinging of the hatch.

FIG. 2 is a section view made of the tubular body 5. This Figure shows the two bearings 4*a* and 4*b* in which the tubular body 5 is mounted by means of a ring 20 in bearing 4*b* and a ring 21 in bearing 4*a*. Inside the body 5, a cartridge 6 and a cartridge 7 are positioned one at each end between which a rod 8 is positioned.

Each cartridge 6 and 7 is held between a shoulder 16 of the body and respectively a spring retaining ring 12*a* and 12*b*. Each cartridge 6 or 7 encloses a stack of Belleville washers 11 that are pre-mounted and pre-adjusted and held between a bottom 14 or 15 (constituted by a plug screwed into the cartridge) and respectively a piston 13*a* or 13*b*, each piston being extended by a piston finger protruding from the cartridge and pressing on a lateral face of the rod 8.

The rod 8 is made integral in rotation with the body 5 by a long nipple screw 9 that cooperates with a longitudinal groove 31 in the rod 8. The rod 8 is furthermore provided with a helicoidal groove 22 in which a finger 10 fixed in the interface 2 is positioned.

During the opening or closing of the hatch 1, the finger 10 that is fixed with respect to the interface 2, travels along the helicoidal groove 22 thereby causing the translation of the rod 8 rightwards or leftwards in the plane of the Figure and the compression of the finger of piston 13*a* or 13*b*.

Naturally, the tubular body 5 incorporates a circular groove 32 (perpendicular to the plane of FIG. 2) that enables the finger 10 to pass and, during the maneuvering of the hatch 1, enables the rotation of the body 5 (which carries the rod 8) with respect to the finger 10 which remains fixed.

The translation of the piston 13*a* or 13*b* drives the compression of the Belleville washers 11 of the cartridge 6 or 7. Such a structure ensures a very precise balance in the opening operation and the Belleville washers 11 can be mounted in each cartridge 6 or 7 in opposition to increase the stiffness of the assembly or in parallel to increase the stroke of the rod 8. The adjustment of the assembly is thus easy for the Expert to perform and, moreover, the cartridges can be easily extracted so as to modify or change the stacks of Belleville washers.

It goes without saying that each cartridge 6 or 7 may incorporate a different stack of washers so that the translation movement of the rod 8 ensures a differentiated action of the damping means 6 or 7.

It is thus possible to obtain a different stiffness for each cartridge 6 or 7, and thus different damping characteristics for the opening and closing movements of the hatch.

This is particularly advantageous when the hatch is intended to be mounted on walls forming an angle with respect to the horizontal. Indeed, for such inclined hatches, the effort required to maneuver a hatch is different for the opening movement and the closing movement.

Thanks to the invention, the same hatch may be used for a horizontal wall and for an inclined wall (for example on a vehicle glacis). The stiffness characteristics of cartridges 6 or 7 merely have to be modified and a different stiffness selected for the opening and closing operations.

This is not possible in classical systems in which the stiffness is constant both for the opening and the closing.

Figure 3A:
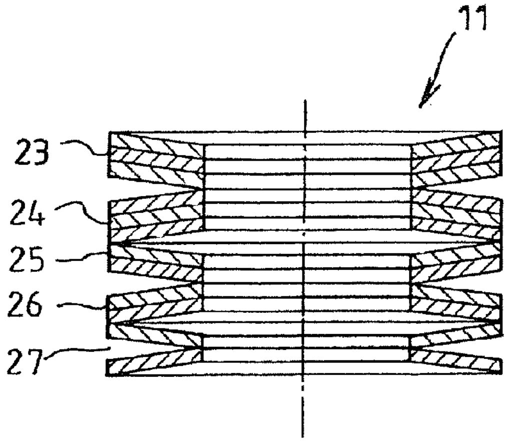
FIGS. 3*a* and 3*b* show examples of a set of Belleville washers.
Figure 3B:
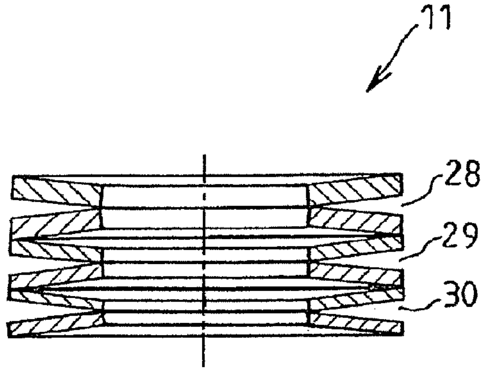

FIGS. 3*a* and 3*b* show different configuration combinations for five Belleville washer 11 assemblies.

FIG. 3*a* shows a first assembly 23 of three washers mounted in parallel followed by an assembly of three washers 24 also mounted in parallel, but in opposition with respect to assembly 23. The third assembly 25 comprises two washers mounted in parallel and in opposition with respect to assembly 24; assembly 26 incorporates two washers mounted in parallel but in opposition with respect to assembly 25 and assembly 27 is composed of two washers mounted in opposition.

FIG. 3*b* shows a stack of three assemblies 28, 29 and 30, each constituted by two washers mounted in opposition and said assemblies being themselves mounted in opposition. The Expert may thus easily define the stiffness and elongation of a stack of washers 11 by combining the different assemblies described.

Figure 4:
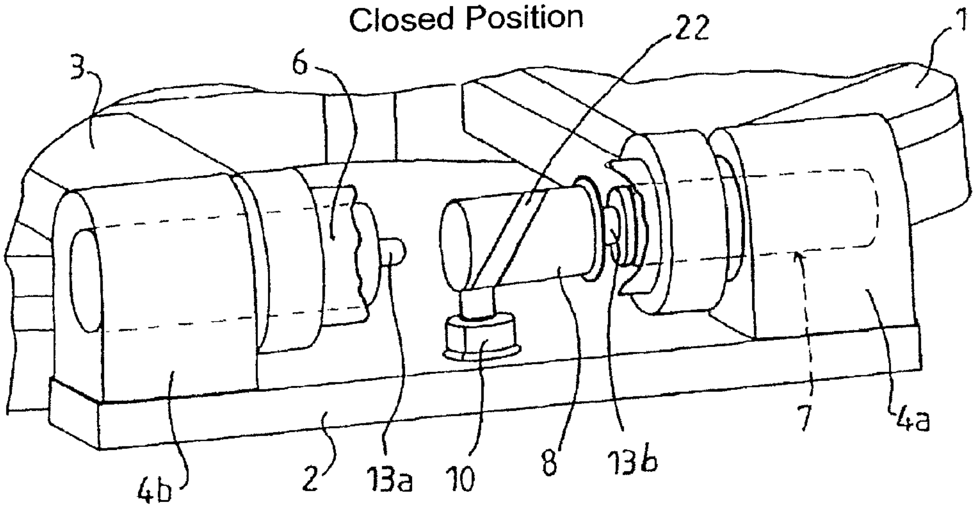
FIG. 4 shows the position of the hatch in its closing position.

FIG. 4 shows the hatch 1 in the closing position. In this configuration, the rod 8 has moved rightwards (in the plane of the Figure) and has compressed the washers 11 in cartridge 7 by the translation of the piston 13*b*. Crushing the stack of washers enables the hatch to be damped.

Figure 5:
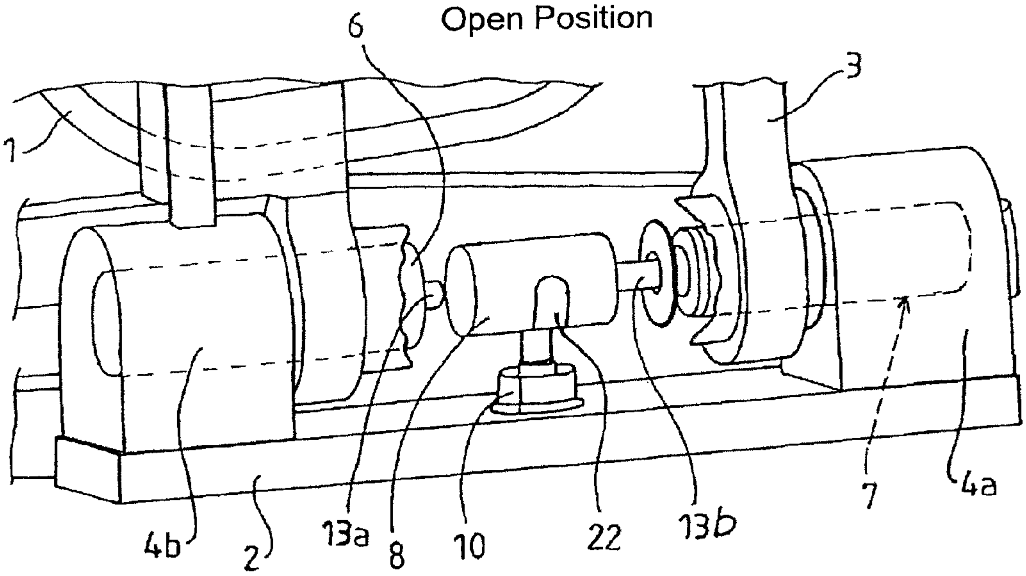
FIG. 5 shows the position of the hatch in its opening position.

FIG. 5 shows the hatch 1 in the opening position. In this configuration, the rod 8 presses on the piston 13*a* to compress the stack of washers 11 in cartridge 6 by translation of piston 13*a*.

What is claimed is:

1. A damping device for a hatch in a military vehicle used during its closing and opening, said hatch being hinged with respect to an interface, wherein:

said damping device comprises a tubular body hinged between two bearings integral with said interface, said tubular body encloses two damping systems between which a rod is positioned, said rod is driven in rotation by said tubular body, a finger is integral with said interface and is engaged in a helical groove of said rod so as to cause a translational movement of said rod, said rod is mobile in translation to activate one of said damping systems during the opening of said hatch and wherein said rod is mobile in translation to activate the other of said damping systems during the closing of said hatch, said damping systems are each in the form of a cartridge enclosing Belleville washers and inserted into said tubular body, and each of said cartridges comprises a piston to compress said washers, each of the pistons equipped with a piston finger pressing on said rod.

2. A damping device for a hatch according to claim 1, wherein said rod is linked to said tubular body by means of a long nipple screw.

3. A damping device for a hatch according to claim 1, wherein said washers are mounted in opposition or in parallel in each of said cartridges.

4. A damping device for a hatch according to claim 1, wherein each of said cartridges presses on an internal shoulder in said tubular body and is held by a spring retaining ring.

5. A damping device for a hatch according to claim 1, wherein each of said cartridges is closed by means of a threaded plug.

6. A damping device for a hatch according to claim 1, wherein said damping systems are of different stiffnesses.

7. A damping device according to claim 1, wherein ends of said tubular body are supported by said two bearings.

8. A damping device for a hatch in a military vehicle used during its closing and opening, said hatch being hinged with respect to an interface, wherein:

said damping device comprises a tubular body hinged between two bearings integral with said interface, said tubular body encloses two damping systems between which a rod is positioned, said rod is driven in rotation by said tubular body, a finger is integral with said interface and is engaged in a helical groove of said rod so as to cause a translational movement of said rod, and said damping device further comprises two pistons, one piston pressed against one of said two damping systems and said other piston pressed against said other of said two damping systems, said one piston is intended to press against an end of said rod and said other piston is intended to press against an other end of said rod, said hatch is movable from a closing position to an opening position, and said rod is mobile in translation, from an intermediate position, to activate only one of said two damping systems during opening of said hatch and to activate only said other of said two damping systems during closing of said hatch.

9. A damping device according to claim 8, wherein the hatch is movable from a closing position to an opening position, wherein, when the hatch is in the closing position, said rod compresses only one of said two damping systems and when said hatch is in said opening position, said rod compresses only said other of said two damping systems.

* * * * *